Figure 1:
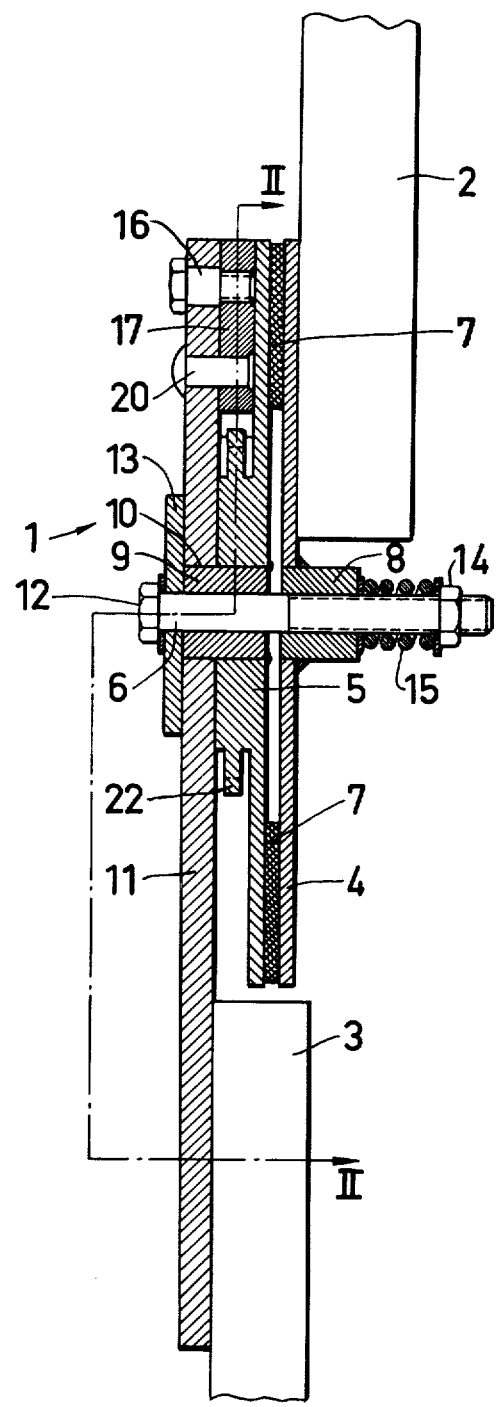

United States Patent [19]
Lindgren

[11] 3,904,298
[45] Sept. 9, 1975

[54] FRICTION JOINT

[75] Inventor: Malkolm Lindgren, Skelleftea, Sweden

[73] Assignee: AB Holmbom & Hedlund, Skelleftea, Sweden

[22] Filed: Oct. 9, 1973

[21] Appl. No.: 404,589

[30] Foreign Application Priority Data
Oct. 9, 1972  Sweden .................. 1300/72

[52] U.S. Cl. ............... 403/93; 192/43.1; 192/48.3; 188/71.2
[51] Int. Cl. ............... F16d 1/12; F16d 3/10
[58] Field of Search ............ 192/43.1, 48.3, 46, 71, 192/79, 89 W; 64/30 C; 188/71.2; 137/355.16, 355.17, 355.18, 355.24, 615; 248/280, 338, 291, 293, 294, 278; 403/93, 94, 95, 96

[56] References Cited
UNITED STATES PATENTS

| 253,753 | 2/1882 | Ohl | 192/43.1 |
| 257,306 | 5/1882 | Farley | 192/43.1 |
| 367,723 | 8/1887 | Orcutt | 192/43.1 |
| 1,140,167 | 5/1915 | Kolb et al. | 192/43.1 |
| 1,680,515 | 8/1928 | Gormley | 192/43.1 |
| 2,214,901 | 9/1940 | Griffin | 64/30 C |
| 2,896,759 | 7/1959 | Huguenin | 192/46 |
| 2,940,283 | 6/1960 | Christenson et al. | 64/30 C |

FOREIGN PATENTS OR APPLICATIONS
723,252  2/1955  United Kingdom ................ 403/93

Primary Examiner—Samuel Scott
Assistant Examiner—Allan R. Burke
Attorney, Agent, or Firm—Pollock, Philpitt & Vande Sande

[57] ABSTRACT

A friction joint between two members which is of the type wherein one of the members may be freely rotated relative to the other member in either direction independently of a frictional coupling means which forms a part of the joint. When thereafter said one member is attempted to be rotated back to its initial position, it becomes locked in place relative to the other member and thereafter be rotated in the opposite direction only by overcoming the restraining frictional coupling.

4 Claims, 2 Drawing Figures

FRICTION JOINT

This invention relates to a friction joint between two members whereof at least one is movable in a plane in relation to the other member about an axle common to both members, which joint comprises at least two friction and/or contact surfaces abutting one another with adjustable load and associated each to one member.

Friction joints are utilized in many cases as self-locking or self-catching joints in articulated arms of various kinds, particularly in such articulated arms in which the arm portions are desired to be adjustable to different positions relative to another without the arm portions on both sides of the joint having to change their relative position after the adjustment, even when one of said arm portions is subjected to a certain load exceeding its own weight. The known friction joints, in short terms, can be said to consist of two discs having a common axle which abut each other with adjustable load and have a friction lining of some kind between themselves, at which joints the load on the discs can be effected, for example, by means of a spring clamped against one of the discs. Due to this design, however, the force required for turning the discs in relation to one another, is substantially greater in the upward direction, i.e. the direction against which the load on one arm portion and the gravity of said arm portion act, than in the opposed direction, in which said load and said gravity act. This has proved to be of great disadvantage in many application fields, particularly when an arm comprising such a joint is mounted in attachment to a work piece, because often both hands are needed for pivoting the arm upwards. Consequently, one has to lay down the tool or implement just being used.

The present invention, therefore, has as its object to eliminate this disadvantage of the known friction joints and to provide a friction joint of the kind referred to in the introductory portion, in which joint the friction forces acting between the discs are entirely eliminated when one member of the arm is being pivoted in the upward direction towards the other arm member. This object of the invention is achieved in that the friction joint according to the invention has been given the characterizing features defined in the claims.

Figure 2:
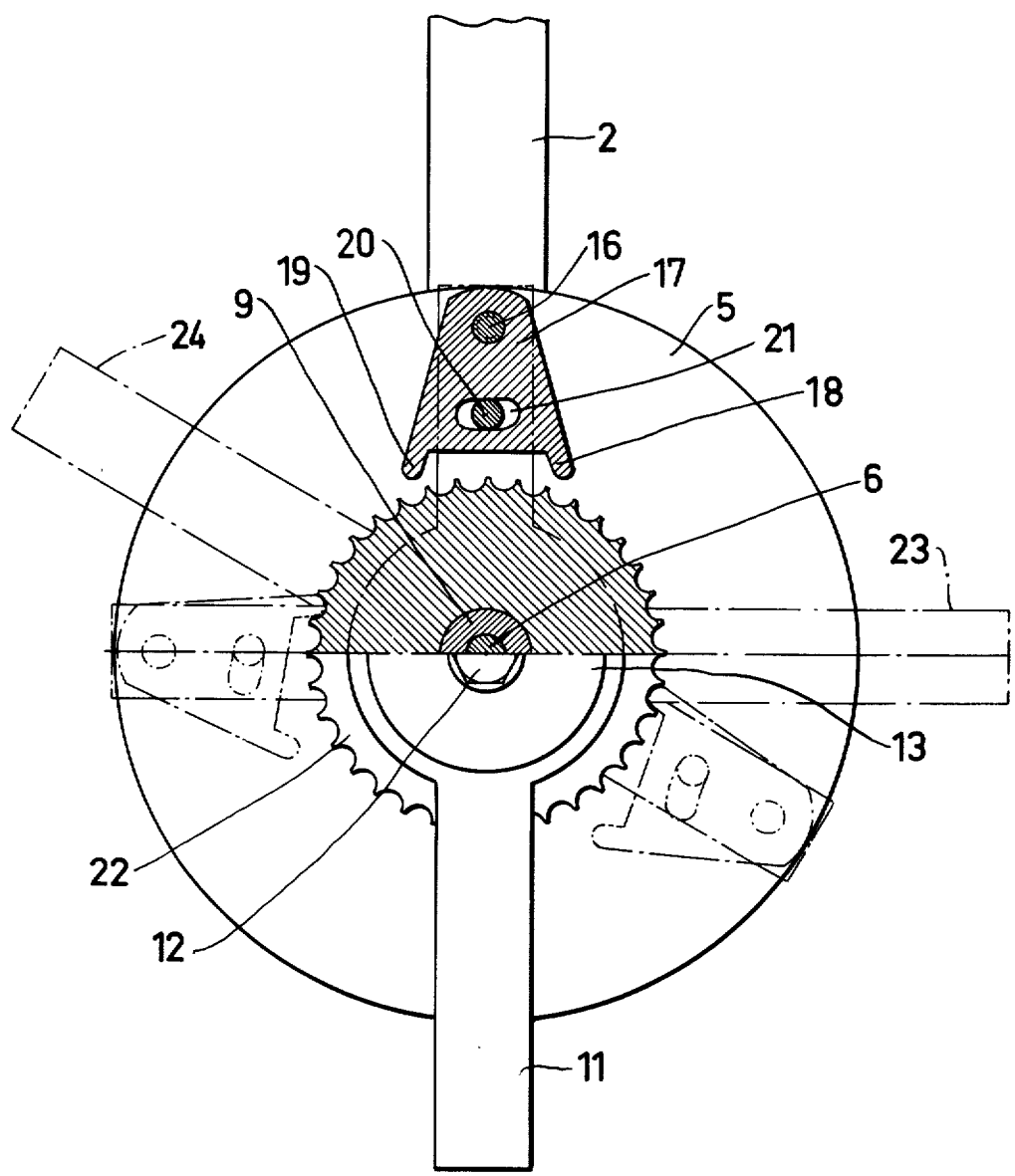

The invention is described in greater detail in the following, by way of one embodiment and with reference to the accompanying drawings, in which FIG. 1 shows a section through an embodiment of the friction joint according to the invention, and FIG. 2 shows a section along the line II—II in FIG. 1 with two imagined positions drafted by dash-dotted lines.

In the drawings, 1 designates generally the friction joint according to the invention. The joint is disposed between and connects pivotally in one plane two members 2 and, respectively, 3 of an articulated arm. The members are shown only, partially in the Figures. The member 2 is for reasons of simplicity is hereinafter regarded as non-pivotal perpendicularly to the plane of the drawing in FIG. 1 and called the stationary member although it may be arranged so as to be pivotal, rotatable and axially movable. The member 3 will be called the movable member. Adjacent said stationary member, a preferably circular disc 4 is provided which, in the embodiment shown, is rigidly connected with the member 2, but in other embodiments the disc may be formed as a portion of or integral with said stationary member 2. Concentrically with said disc 4, a further preferably circular disc 5 is arranged, which is carried by an axle 6 common to both said discs and abuts the disc 4 by way of an intermediate friction lining 7 of some kind which may be attached to one and/or the other disc. The axle 6 is supported in two bushings 8 and 9, of which the bushing 8 is rigidly connected with the disc 4, and the bushing 9 with the disc 5. Said last-mentioned bushing is disposed rotatably in a bore 10 in the movable member 3 or, as shown in the Figures, in an end portion 11, which is rigidly connected with the movable member 3 and projects therefrom. In other words, the movable member 3 is supported freely on the bushing 9, and, thus, can be pivoted independently of the disc 5 and the stationary member 2. The various parts included in the joint are held together by the axle 6, which the embodiment shown is a screw, which with its head 12 contacts a plate 13 abutting both the bushing 9 and the end portion 11. The screw is provided with a nut 14, and between the nut and the bushing 8 a spring 15 is clamped which, thus, presses the discs 4 and 5 against each other with a force which can be adjusted by the nut 14.

At the surface of the end portion 11 which faces towards the stationary member 2, a locking device is suspended by means of a pin 16 or the like. The locking device is formed with two laterally disposed projections 18 and 19 and is limited pivotally about its mounting point 16 by a pin 20 and a slot 21. Said locking device 17 coacts by its projections 18 and 19 with a toothed ring 22 on the disc 5 for engaging and disengaging the friction forces of the joint which act between the discs 4 and 5, as will become evident from the following.

In the position shown in FIGS. 1 and 2, in which the members 2 and 3 are disposed straightly one beneath the other, the locking device 17 does not act, but the movable member 3 can at the beginning pivot unobstructedly either in the clockwise or counterclockwise direction. When the movable member 3 is pivoted, for example, in the counterclockwise direction in FIG. 2, the locking device 17 by action of gravity will pivot about the pin 16 to one of its end positions defined by the slot 21 and pin 20. The projection 18 of the locking device is thereby brought into contact with the teeth of the toothed ring 22 and will slip over the teeth as long as the movable member 3 will pivot in the counterclockwise direction. Thus, the movable member can be pivoted in a direction independently of the friction between the discs 5 and 4. When the movable member 3 is released, for example in the position indicated in FIG. 2 by the dash-dotted lines 23, the locking device 17 by its projection 18 engages with a tooth gap between two teeth of the toothed ring 22 and thereby so connects or couples together the movable member 3 and the disc 5 that they cannot rotate relative to one another. The movable member 3, thus, is locked in this position with a force corresponding to the friction forces between the two discs 4 and 5, disregarding the weight of the movable member 3 itself which can be taken up by a spring (not shown) clamped between the two members 2 and 3. In order to be able to pivot the arm in the clockwise direction from the position indicated in FIG. 2 by 23, the friction forces between the discs 4 and 5 must be overcome, because the locking device 17 so connects the movable member 3 with the disc 5 that they cannot rotate relative one another. In a corresponding manner the projection 19 of the locking device will coact with the teeth of the toothed ring 22 when the movable member 3 is being pivoted in the clockwise direction from the position indicated in FIG. 2 by fully drawn lines to, for example, the position indicated by the dash-dotted lines 24.

The present invention is not restricted to the embodiment described above and shown in the drawings, but can be modified and altered in many different ways within the scope of the claims. The pin 20 and associated slot 21, for example, can be excluded, in which case the movement of the locking device will be limited by the engagement of the device with the teeth of the toothed ring 22.

What I claim is:

1. A friction joint between two members of the type wherein one said member may be freely rotated about the other member in either direction from an initial position independently of a frictional coupling but thereafter becomes locked in place and can then be rotated in the opposite direction only by overcoming the restraining frictional coupling, said friction joint apparatus comprising:

a common axle for both said members, a disc frictional coupling means mounted therein, said disc being rotatable about said axle and being in frictional engagement with a first of said members, and locking means on a second of said members and on said disc for locking said second member to said disc only when said second member has been rotated in either direction from an initial position and is thereafter urged back to its initial position, whereby said second member can be rotated back to its said initial position only by overcoming the frictional force exerted by said frictional coupling means.

2. A joint as defined in claim 1, characterized in that said locking means comprises a catch member suspended for limited pivotal movement about its mouting point on said second member, said catch member by action of gravity being brought into engagement with a toothed ring on said movable disc as said second member is rotated in either direction about said axle from an initial position, for locking said first member to said disc in response to attempted rotation of said second member back to its initial position.

3. A joint as defined in claim 2, characterized in that said catch member is provided with two projections, which are disposed symmetrically in relation to a centre line through the catch member and its mounting point.

4. A joint as defined in claim 1, characterized in that said rotatable disc is supported on said axle by means of a bushing on which said second member is freely supported.

* * * * *